UNITED STATES PATENT OFFICE 2,153,539

WATER-INSOLUBLE AZO DYESTUFFS AND FIBER DYED THEREWITH

Leopold Laska, Offenbach-on-the-Main, Arthur Zitscher, Kronberg in Taunus, and Rudolf Heil, Offenbach-on-the-Main, Germany, assignors to General Aniline Works, Inc., New York, N. Y., a corporation of Delaware No Drawing. Application August 11, 1937, Serial No. 158,619. In Germany August 12, 1936

8 Claims. (Cl. 260—176)

The present invention relates to water-insoluble azo dyestuffs and to fiber dyed therewith; more particularly, it relates to dyestuffs of the following general formula:

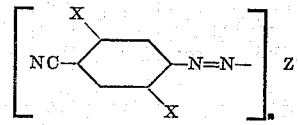

wherein $n$ stands for one of the numbers 1 and 2, the X's stand for substituents and Z means the radical of a $\beta$-ketocarboxylic acid arylamide.

We have found that valuable azo dyestuffs insoluble in water may be obtained by coupling in substance, on a fiber or on a substratum adapted for the production of lakes, the diazo compound of a 1-amino-4-nitrilobenzene substituted in 2- and 5-position with a $\beta$-ketocarboxylic acid arylamide, the dyestuff components not containing any solubilizing groups such as sulfonic acid or carboxylic acid groups.

When made in substance the new dyestuffs may be used for the preparation of valuable pigments; they are, however, also particularly suitable for the production of insoluble dyestuffs on the fiber, both native and regenerated cellulose fibers and animal fibers, by the ice color method or by one of the usual printing methods, for instance in direct printing or according to the known printing process with use of nitrosamines or diazo-amino-compounds or the like.

The following examples serve to illustrate the invention, but they are not intended to limit it thereto:

(1) Well boiled, bleached cotton yarn is impregnated with a solution alkaline with caustic soda prepared in the usual manner and containing per liter 1.5 grams of terephthalo-bis-(acetyl-1-amino-2-methoxy-5-methyl-4-chlorobenzene), (proportion of the goods to the liquor 1:20, 30 minutes). The impregnated material is dehydrated and developed in a solution containing per liter 3.3 grams of 1-amino-5-methoxy-2-chloro-4-nitrilobenzene in the form of a diazo-compound, 10 cc. of acetic acid of 50 per cent. strength and 10 grams of sodium acetate. The dyeing is rinsed cold and hot and after-treated with a boiling soap-solution containing per liter 0.5 gram of sodium hydrosulfite and 0.5 cc. of caustic soda solution of 38° Bé. A reddish yellow shade of good fastness to light is obtained. The dyestuff corresponds with the following formula:

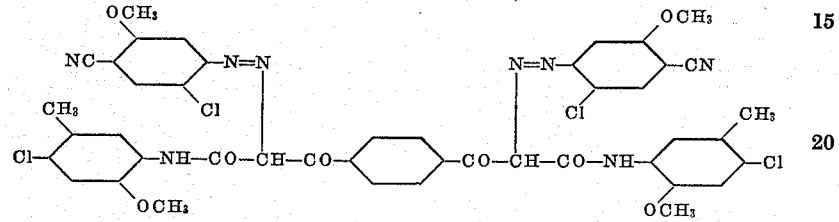

(2) An artificial silk mixed fabric (cotton with viscose artificial silk) is impregnated in known manner on a foulard at 70° C. to 80° C. with a caustic alkaline solution containing per liter 10 grams of 4,4'-di-(acetoacetylamino)-3,3'-dimethyldiphenyl, intermediately dried and then developed on a foulard with a solution containing per liter the diazo-compound from 8.5 grams of 1-amino-5-methyl-2-chloro-4-nitrilobenzene and 20 cc. of acetic acid of 50 per cent. strength. The material is rinsed and then treated for a short time at 70° C. to 75° C. with a solution of 5 grams of Marseille soap per liter, well rinsed and dried.

The dyeing is then printed with a discharge consisting of 200 grams of sodium formaldehyde-sulfoxylate, 40 grams of sodium benzylsulfanilate, 30 grams of potassium carbonate, 40 grams of an anthraquinone paste (30 per cent.), 500 grams of neutral starch-tragacanth thickening and 150 grams of water, dried, steamed, then rinsed hot, soaped at boiling temperature, rinsed again and dried.

A pure white discharge effect on a reddish-yellow ground is obtained.

(3) Desized and bleached cotton piece goods are printed with the following paste:

- 33 grams of the potassium compound of 5-methyl-2-chloro-4-nitrilobenzene-1-nitrosamine (aqueous paste with a content of 44.9 per cent. of pure base and containing 4.2 per cent. of caustic potash),
- 13 grams of 4,4'-di-(acetoacetylamino)-3,3'-dimethyldiphenyl,
- 30 grams of caustic soda solution of 34° Bé.,
- 15 grams of Turkey red oil of 50 per cent. strength and
- 15 grams of alcohol are dissolved with

- 387 grams of warm water and made up with
- 500 grams of neutral starch-tragacanth thickening to
- 1 kilo of printing color.

After drying, the printed material is steamed for 3 minutes in the moist state or exposed to air overnight and subsequently passed through a bath having a temperature of 80° C. to 90° C. and containing 20 grams of acetic acid of 50 per cent. strength per liter, rinsed hot and after-treated with a boiling soap solution containing per liter 0.5 gram of sodium hydrosulfite and 0.5 cc. of caustic soda solution of 38° Bé.

A yellow print of very good fastness to light is obtained.

(4) Degummed spun silk is impregnated in the usual manner with a caustic alkaline solution containing per liter 1 gram of terephthalo-bis-(acetyl-1-amino-2,4-dimethoxy-5-chlorobenzene) and one of the usual protective agents for silk, for instance 1.5 grams of purified sulfite cellulose waste liquor in the form of a powder, (proportion of the goods to the liquor 1:30), squeezed and then developed in a diazo-solution neutralized by means of sodium acetate and containing per liter the diazo-compound from 1.6 grams of 1-amino-5-methoxy-2-chloro-4-nitrilobenzene, a small quantity of acetic acid being added for the coupling.

The material is rinsed, acidified and soaped at boiling temperature. A yellow dyeing of very good fastness to light is obtained.

(5) 16.7 parts by weight of 1-amino-5-methyl-2-chloro-4-nitrilobenzene are diazotized in the usual manner and the diazo-solution is coupled with a solution of 23.9 parts by weight of 1-acetoacetylamino-2,5-dimethoxy-4-chlorobenzene in dilute caustic soda solution, to which there have been added the amount of sodium acetate sufficient for binding the excess of mineral acid, and Turkey red oil. The precipitated dyestuff is filtered with suction and washed well. When worked up with a substratum in the usual manner, advantageously in the form of a paste, it yields a greenish yellow lake of a high degree of fastness to light.

The following table illustrates a number of combinations which may be prepared by this invention and the shades obtained:

| Diazo-compound from— | Coupled with— | Shade |
|---|---|---|
| 1-amino-5-methyl-2-chloro-4-nitrilobenzene _____ 2 mols__ | 4,4'-di-(acetoacetylamino)-3,3'-dimethoxydiphenyl _____ | Reddish yellow. |
| 1-amino-5-methyl-2-chloro-4-nitrilobenzene _____ 1 mol__ | 1-aceto-acetylamino- -3,4-dimethoxy-6-chlorobenzene _____ | Yellow. |
| Do _____ | -2-methoxy-5-methyl-4-chlorobenzene _____ | Yellow. |
| Do _____ | -2-methoxy-4-chlorobenzene _____ | Greenish yellow. |
| Do _____ | -2-methyl-5-bromobenzene _____ | Greenish yellow. |
| Do _____ | -2,5-dimethoxy-4-bromobenzene _____ | Yellow. |
| Do _____ | -4-ethoxybenzene _____ | Greenish yellow. |
| Do _____ | -2-ethylbenzene _____ | Greenish yellow. |
| Do _____ | -2,5-diethoxy-4-chlorobenzene _____ | Yellow. |
| 1-amino-5-methyl-2-chloro-4-nitrilobenzene _____ | 1-benzoylacetylamino- -2,5-dimethoxy-4-benzoylaminobenzene _____ | Reddish yellow. |
| Do _____ | -2,5-dimethoxy-4-chlorobenzene _____ | Yellow. |
| Do _____ 2 mols__ | Terephthalo-bis-(acetyl-1-amino-2,4-dimethoxy-5-chlorobenzene). | Yellow. |
| Do _____ 2 mols__ | Terephthalo-bis-(acetyl-1-amino-2-methoxy-5-methyl-4-chlorobenzene). | Yellow. |
| 1-amino-5-methyl-2-bromo-4-nitrilobenzene _____ 2 mols__ | 4,4'-di-(acetoacetylamino)-3,3'-dimethyldiphenyl _____ | Reddish yellow. |
| Do _____ 2 mols__ | Terephthalo-bis-(acetyl-1-amino-2,4-dimethoxy-5-chlorobenzene). | Reddish yellow. |
| Do _____ 2 mols__ | Terephthalo-bis-(acetyl-1-amino-2-methoxy-5-methyl-4-chlorobenzene). | Yellow. |
| Do _____ | 1-acetoacetylamino-2,5-dimethoxy-4-bromobenzene _____ | Yellow. |
| Do _____ | 1-acetoacetylamino-4-nitronaphthalene _____ | Greenish yellow. |
| Do _____ | 1-benzoyl-acetylamino-2,5-dimethoxy-4-chlorobenzene _____ | Yellow. |
| 1-amino-2-methyl-5-chloro-4-nitrilobenzene _____ 2 mols__ | 4,4'-di-(acetoacetylamino)- -3,3'-dimethyldiphenyl _____ | Reddish yellow. |
| Do _____ 2 mols__ | -3,3'-dimethoxydiphenyl _____ | Reddish yellow. |
| Do _____ | 1-acetoacetylamino-2-methoxy-5-methyl-4-chlorobenzene _____ | Greenish yellow. |
| Do _____ | 1-acetoacetylamino-2-methyl-5-bromobenzene _____ | Greenish yellow. |
| Do _____ | 1-acetoacetylamino-2,5-diethoxy-4-chlorobenzene _____ | Yellow. |
| Do _____ | 1-benzoylacetylamino-2,5-dimethoxy-4-chlorobenzene _____ | Yellow. |
| 1-amino-2-methyl-5-chloro-4-nitrilobenzene _____ 2 mols__ | Terephthalo-bis-(acetyl-1-amino-2,4-dimethoxy-5-chlorobenzene). | Reddish yellow. |
| 1-amino-5-methoxy-2-chloro-4-nitrilobenzene _____ 2 mols__ | 4,4'-di-(acetoacetylamino)-diphenyl _____ | Yellow. |
| Do _____ | 1-acetoacetylamino- -2,5-dimethoxy-4-chlorobenzene _____ | Greenish yellow. |
| Do _____ | -2-methoxy-5-methyl-4-chlorobenzene _____ | Greenish yellow. |
| Do _____ | -2-methoxy-4-chlorobenzene _____ | Greenish yellow. |
| Do _____ | -4-ethoxybenzene _____ | Greenish yellow. |
| Do _____ | 1-benzoylacetylamino-2,5-dimethoxy-4-benzoylaminobenzene. | Reddish yellow. |
| Do _____ 2 mols__ | Terephthalo-bis-(acetyl-1-amino-2,4-dimethoxy-5-chlorobenzene). | Reddish yellow. |
| 1-amino-5-ethoxy-2-chloro-4-nitrilobenzene _____ 2 mols__ | 4,4'-di-(acetoacetylamino)-3,3'-dimethyldiphenyl _____ | Yellow. |
| Do _____ | 1-acetoacetylamino-3,4-dimethoxy-6-chlorobenzene _____ | Yellow. |
| Do _____ | 1-acetoacetylamino- -2-methoxy-4-chlorobenzene _____ | Greenish yellow. |
| Do _____ | -2,5-diethoxy-4-chlorobenzene _____ | Greenish yellow. |
| Do _____ 2 mols__ | Terephthalo-bis-(acetyl-1-amino-2,4-dimethoxy-5-chlorobenzene). | Reddish yellow. |
| 1-amino-2-methoxy-5-chloro-4-nitrilobenzene _____ 2 mols__ | 4,4'-di-(acetoacetylamino)-3,3'-dimethyldiphenyl _____ | Reddish yellow. |
| Do _____ | 1-acetoacetylamino-2,5-dimethoxy-4-chlorobenzene _____ | Yellow. |
| Do _____ | Terephthalo-bis-(acetyl-1-amino-2,4-dimethoxy-5-chlorobenzene). | Reddish yellow. |
| 1-amino-2-phenoxy-5-chloro-4-nitrilobenzene _____ 2 mols__ | 4,4'-di-(acetoacetylamino)-diphenyl _____ | Greenish yellow. |
| Do _____ 2 mols__ | Terephthalo-bis-(acetyl-1-amino-2-methoxy-5-methyl-4-chlorobenzene). | Greenish yellow. |

| Diazo-compound from— | Coupled with— | Shade |
|---|---|---|
| 1-amino-2-phenoxy-5-chloro-4-nitrilobenzene | 1-acetoacetylamino- | |
| Do | -2, 5-dimethoxy-4-chlorobenzene | Yellow. |
| Do | -2, 5-dimethoxy-4-bromobenzene | Yellow. |
| Do | -2, 5-diethoxy-4-chlorobenzene | Yellow. |
| Do | -2, 5-diethoxy-4-benzoylaminobenzene | Reddish yellow. |
| Do | 1-benzoylacetylamino-2, 5-dimethoxy-4-chlorobenzene | Yellow. |
| 1-amino-2, 5-dichloro-4-nitrilobenzene _____ 2 mols | 4, 4'-di-(acetoacetylamino)-diphenyl | Yellow. |
| Do _____ 2 mols | 4, 4'-di-(acetoacetylamino)-3, 3'-dimethyl-diphenyl | Golden yellow. |
| Do | 1-acetoacetylamino- | |
| Do | -2, 5-dimethoxy-4-chlorobenzene | Golden yellow. |
| Do | -2-methoxy-5-methyl-4-chlorobenzene | Greenish yellow. |
| Do | -2, 5-dimethoxy-4-bromobenzene | Reddish yellow. |
| Do | -2, 5-diethoxy-4-chlorobenzene | Reddish yellow. |
| Do | -2, 5-diethoxy-4-benzoylaminobenzene | Orange. |
| 1-amino-2, 5-dichloro-4-nitrilobenzene | 1-benzoylacetylamino- | |
| Do | -2, 5-dimethoxy-4-benzoyl-aminobenzene | Brownish yellow. |
| Do | -2, 5-dimethoxy-4-chloro-benzene | Yellow. |
| Do _____ 2 mols | Terephthalo-bis-(acetyl-1-amino-2-methoxy-5-methyl-4-chlorobenzene). | Golden yellow. |
| 1-amino-2, 5-dimethyl-4-nitrilobenzene _____ 2 mols | 4, 4'-di-(acetoacetylamino)-3, 3'-dimethyldiphenyl | Reddish yellow. |
| Do | 1-aceto-acetylamino-2, 5-dimethoxy-4-chlorobenzene | Yellow. |
| Do | 1-aceto-acetylamino-2-methoxy-5-methyl-4-chlorobenzene | Greenish yellow. |
| Do | 1-benzoylacetylamino-2, 5-dimethoxy-4-benzoylaminobenzene | Reddish yellow. |
| Do _____ 2 mols | Terephthalo-bis-(acetyl-1-amino-2, 4-dimethoxy-5-chlorobenzene). | Reddish yellow. |
| 1-amino-5-methoxy-2-methyl-4-nitrilobenzene _____ 2 mols | 4, 4'-di-(acetoacetylamino)-3, 3'-dimethyldiphenyl | Golden yellow. |
| Do _____ 2 mols | Terephthalo-bis-(acetyl-1-amino-2-methoxy-5-methyl-4-chlorobenzene). | Yellow. |
| Do | 1-acetoacetylamino-2, 5-di-methoxy-4-chlorobenzene | Yellow. |
| Do | 1-aceto-acetylamino-2-methyl-5-bromobenzene | Greenish yellow. |
| 1-amino-2-methoxy-5-methyl-4-nitrilobenzene _____ 2 mols | 4, 4'-di-(acetoacetylamino)-3, 3'-dimethyldiphenyl | Reddish yellow. |
| | 1-aceto-acetylamino- | |
| Do | -2, 5-dimethoxy-4-chlorobenzene | Yellow. |
| Do | -2-methoxy-5-methyl-4-chloro-benzene | Greenish yellow. |
| Do | -2, 5-dimethoxy-4-bromobenzene | Yellow. |
| Do | -2,5-diethoxy-4-benzoylamino-benzene | Reddish yellow. |
| 1-amino-2-methoxy-5-methyl-4-nitrilobenzene | 1-aceto-acetylamino- | |
| | -4-nitronaphthalene | Yellow. |
| Do | 1-benzoylacetylamino-2,5-dimethoxy-4-benzoylaminobenzene | Reddish yellow. |
| Do _____ 2 mols | Terephthalo-bis-(acetyl-1-amino-2,4-dimethoxy-5-chlorobenzene). | Reddish yellow. |
| 1-amino-2-ethoxy-5-methyl-4-nitrilobenzene _____ 2 mols | 4,4'-di-(acetoacetylamino)-diphenyl | Greenish yellow. |
| Do | 1-aceto-acetylamino-2,5-dimethoxy-4-bromobenzene | Yellow. |
| Do | 1-aceto-acetylamino-4-ethoxybenzene | Greenish yellow. |
| Do | 1-benzoyl-acetylamino-2,5-dimethoxy-4-chlorobenzene | Yellow. |
| 1-amino-2,5-dimethoxy-4-nitrilobenzene _____ 2 mols | 4,4'-di-(acetoacetylamino)-3,3'-dimethyldiphenyl | Yellow. |
| | 1-aceto-acetylamino- | |
| Do | -2,5-dimethoxy-4-chlorobenzene | Yellow. |
| Do | -2-methoxy-5-methyl-4-chlorobenzene | Yellow. |
| Do | -2,5-diethoxy-4-chlorobenzene | Reddish yellow. |
| Do | 1-benzoyl-acetylamino-2,5-dimethoxy-4-benzoylaminobenzene | Reddish yellow. |
| 1-amino-2,5-diethoxy-4-nitrilobenzene _____ 2 mols | 4,4'-di-(acetoacetylamino)-3,3'-dimethyldiphenyl | Reddish yellow. |
| Do | 1-aceto-acetylamino-2,5-dimethoxy-4-chlorobenzene | Yellow. |
| Do | 1-aceto-acetylamino-2,5-dimethoxy-4-bromobenzene | Golden yellow. |
| Do | 1-benzoylacetylamino-2,5-dimethoxy-4-chlorobenzene | Yellow. |
| 1-amino-2,5-diethoxy-4-nitrilobenzene | 1-benzoylacetylamino-2, 5-dimethoxy-4-benzoylamino-benzene | Reddish yellow. |
| Do _____ 2 mols | Terephthalo-bis-(acetyl-1-amino-2-methoxy-5-methyl-4-chlorobenzene). | Reddish yellow. |
| 1-amino-5-methyl-2-diethylaminosulfonyl-4-nitrilo-benzene. 1 mol | 1-aceto-acetylamino-2, 5-di-methyl-4-chlorobenzene | Greenish yellow. |
| Do | 1-aceto-acetylamino-2, 5-diethoxy-4-chlorobenzene | Reddish yellow. |
| Do | 1-benzoylacetylamino-2, 5-dimethoxy-4-benzoylamino-benzene | Reddish yellow. |
| Do _____ 2 mols | Terephthalo-bis-(acetyl-1-amino-2-methoxy-5-methyl-4-chlorobenzene). | Greenish yellow. |
| 1-amino-5-methoxy-2-diethylaminosulfonyl-4-nitrilobenzene. 2 mols | 4, 4'-di-(acetoacetylamino)-3, 3'-dimethyldiphenyl | Yellow. |
| Do | 1-aceto-acetylamino-2, 5-diethoxy-4-chlorobenzene | Yellow orange. |
| Do _____ 2 mols | Terephthalo-bis-(acetyl-1-amino-2, 4-dimethoxy-5-chlorobenzene). | Reddish yellow. |
| 1-amino-2-methoxy-5-dimethylaminosulfonyl-4-nitrilobenzene. | 1-aceto-acetylamino-2, 5-di-methoxy-4-chlorobenzene | Yellow. |
| Do | 1-aceto-acetylamino-2, 5-di-ethoxy-4-benzoylamino-benzene | Reddish yellow. |
| Do | 1-benzoyl-acetylamino-2, 5-dimethoxy-4-chlorobenzene | Yellow. |
| Do _____ 2 mols | 4, 4'-di-(acetoacetylamino)-3, 3'-dimethyldiphenyl | Reddish yellow. |
| 1-amino-5-methoxy-2-trifluoromethyl-4-nitrilo-benzene. 2 mols | 4, 4'-di-(aceto-acetylamino)-3, 3'-dimethyldiphenyl | Reddish yellow. |
| 1-amino-5-methoxy-2-trifluoromethyl-4-nitrilobenzene | 1-aceto-acetylamino- | |
| Do | -2,5-dimethoxy-4-bromobenzene | Yellow. |
| Do | -4-ethoxybenzene | Greenish yellow. |
| Do | -2.5-diethoxy-4-chlorobenzene | Greenish yellow. |
| Do | -2-ethyl-4-chlorobenzene | Greenish yellow. |
| Do | -4-nitronaphthalene | Yellow. |
| Do | 1-benzoyl-acetylamino-2,5-dimethoxy-4-chlorobenzene | Yellow. |
| Do _____ 2 mols | Terephthalo-bis-(acetyl-1-amino-2-methoxy-5-methyl-4-chlorobenzene). | Greenish yellow. |
| 1-amino-5-methyl-2-methyl-sulfonyl-4-nitrilobenzene | 1-aceto-acetylamino-2,5-dimethoxy-4-chlorobenzene | Greenish yellow. |
| Do | 1-aceto-acetylamino-2,5-diethoxy-4-benzoylaminobenzene | Reddish yellow. |
| Do | 1-benzoylacetylamino-2,5-dimethoxy-4-benzoylaminobenzene | Reddish yellow. |
| Do _____ 2 mols | 4,4'-di-(acetoacetylamino)-3,3'-dimethyldiphenyl | Reddish yellow. |
| 1-amino-5-methyl-2-butyl-sulfonyl-4-nitrilobenzene | 1-aceto-acetylamino-2,5-dimethoxy-4-bromobenzene | Yellow. |
| Do | 1-aceto-acetylamino-2,5-diethoxy-4-chlorobenzene | Greenish yellow. |
| Do | 1-benzoylacetylamino-2,5-dimethoxy-4-chlorobenzene | Yellow. |
| 1-amino-5-ethyl-2-chloro-4-nitrilobenzene _____ 2 mols | 4,4'-di-(aceto-acetylamino)-3,3'-dimethyldiphenyl | Reddish yellow. |
| Do _____ 2 mols | Terephthalo-bis-(acetyl-1-amino-2,4-dimethoxy-5-chlorobenzene). | Yellow. |
| Do | 1-benzoyl-acetylamino-2,5-dimethoxy-4-chlorobenzene | Yellow. |
| Do | 1-aceto-acetylamino-2,5-dimethoxy-4-chlorobenzene | Yellow. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We claim:

1. The water-insoluble azo dyestuffs of the following general formula:

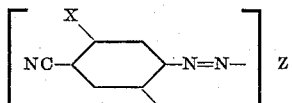

wherein n stands for one of the numbers 1 and 2, the X's stand for members of the group consisting of halogen, alkyl, alkoxy, phenoxy, trifluoromethyl, alkylsulfonyl and dialkylaminosulfonyl, and Z means the radical of a β-ketocarboxylic acid arylamide selected from the group consisting of radicals of the benzene, naphthalene and diphenyl series, yielding yellow to orange shades of good fastness properties, particularly of very good fastness to light.

2. The water-insoluble azo dyestuff of the following formula:

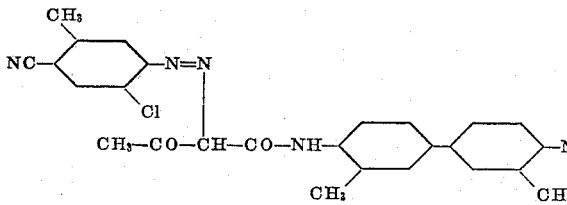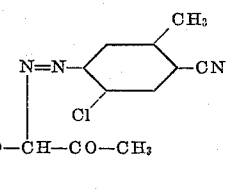

being a reddish-yellow powder, which dissolves in concentrated sulfuric acid to a yellow solution, and yielding reddish-yellow shades of good fastness properties, particularly of very good fastness to light.

3. The water-insoluble azo dyestuff of the following formula:

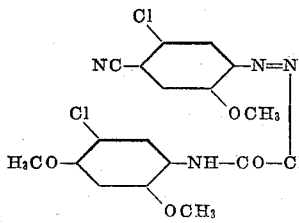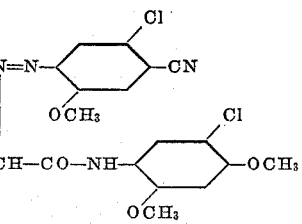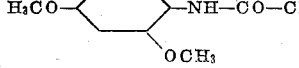

being a yellow powder, which dissolves in concentrated sulfuric acid to a red-orange solution, and yielding reddish-yellow shades of good fastness properties, particularly of very good fastness to light.

4. The water-insoluble azo dyestuff of the following formula:

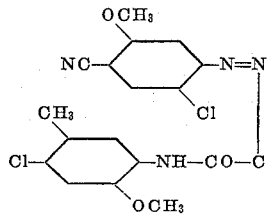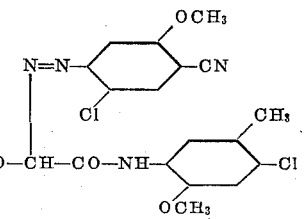

being a reddish-yellow powder, which dissolves in concentrated sulfuric acid to an orange solution, and yielding reddish-yellow shades of good fastness properties, particularly of very good fastness to light.

5. Fiber dyed with the dyestuffs as claimed in claim 1.
6. Fiber dyed with the dyestuff as claimed in claim 2.
7. Fiber dyed with the dyestuff as claimed in claim 3.
8. Fiber dyed with the dyestuff as claimed in claim 4.

LEOPOLD LASKA.
ARTHUR ZITSCHER.
RUDOLF HEIL.